Patented Mar. 14, 1939

2,150,697

UNITED STATES PATENT OFFICE 2,150,697

METHOD OF MAKING PLYWOOD

James V. Nevin, Aberdeen, Wash.

No Drawing. Application August 27, 1934,
Serial No. 741,745

4 Claims. (Cl. 144—309)

This invention relates to a method of making plywood from natural wood veneer sheets and more particularly to a method wherein a partial condensation product is employed in aqueous solution as the binder and the laminations are bonded together by converting the partial condensation product into an infusible resin under the action of heat and pressure.

It has heretofore been proposed to use a solution of a synthetic resin, such as a phenolic condensation product dissolved in alcohol, as the impregnating and binding agent in the manufacture of plywood. The use of synthetic resin varnishes for this purpose, however, is relatively expensive due to the cost of the solvent.

It has also been proposed to use intermediate condensation products of phenolic resins in a dry, pulverized state to bind the various laminations together in the manufacture of plywood. The use of a solid intermediate condensation product, however, necessitates concentration and drying steps that add considerably to the cost of the synthetic resin and therefore to the cost of production of the plywood.

I have now found that plywood may be manufactured at relatively less cost than heretofore if instead of using a resin varnish or a dry intermediate condensation product, an aqueous solution of a partial condensation product of a synthetic resin is used as the binding medium. According to my present process, an aqueous solution of a partial condensation product of a synthetic resin is applied to one or more surfaces of the laminations to be united and then, after drying the surface coatings, the various plies are united together with the application of heat and pressure in the usual manner of making plywood. The product is a relatively hard, dense and water resistant plywood, suitable for outdoor uses where it will be subjected to weather conditions.

It is therefore an important object of this invention to provide a relatively simple and comparatively inexpensive process for the manufacture of plywood having improved characteristics and qualities.

It is a further important object of this invention to provide a method for the manufacture of plywood wherein an aqueous solution of a partial resinous condensation product is employed as the binder for joining the laminations securely together.

It is a further important object of this invention to provide a plywood having improved resistance to the separating action of boiling water and having better shearing strength after being soaked in water.

Other and further important objects of this invention will become apparent from the following description and appended claims.

The steps employed in my method of making plywood are, in general, those customary in the manufacture of plywood, except that I employ a different type of binder than heretofore. The preliminary steps in the manufacture of the plywood include the customary steps of steaming the logs, removing the bark therefrom, cutting out defects and peeling the logs into long strips. The strips may then be cut to the desired size and dried under proper conditions to approximately 3% moisture. The dried veneer sheets are finally cut to finished size and laminated with core material.

According to the present invention, an aqueous solution of an initial resinous condensation product is applied to one or more faces of the core or surface laminations and after the coatings are dried, the laminations are suitably assembled and bonded together in hydraulic presses with the application of heat and pressure.

The aqueous binding solution may be applied either to both faces of the core or only to the surfaces of the facing laminations that are to be united to the core. Preferably, the latter procedure is followed, since I have found that a more economical use of the binding medium is accomplished by applying the aqueous binding solution to the surface laminations only. Inasmuch as the heat is applied through the surface laminations, the fusion of the partial condensation product into an infusible binding layer can be more rapidly accomplished if the coating solution is applied to the surface laminations rather than to the core. The external application of heat and pressure through the platens to the surface laminations appears to drive the resinous binding material more rapidly and efficiently into the core than is the case if the binding solution is applied only to the surfaces of the core.

The binding solution may be prepared from raw ingredients capable of forming various types of synthetic resins of a hard, infusible character. Examples of suitable synthetic resins are those of the phenolic-aldehyde and urea-aldehyde type. Mixtures of a urea and of a phenol with an aldehyde, or polymer of an aldehyde, may also suitably be used. The resin forming ingredients that I prefer to use for this purpose are urea, cresylic acid and formaldehyde. A composition of this character is relatively less expensive than one prepared from phenol (carbolic acid) or from urea alone, and formaldehyde.

The following examples will serve to illustrate methods of preparing various types of binding 5 solutions.

*Example 1*

| | Parts by weight |
|---|---|
| Urea | 14 |
| Formaldehyde (40% aqueous solution) | 42 |
| Meta cresylic acid | 0.4 |
| Sodium arsenate | 1.8 |
| Water | 0.5 |
| Barium acetate or zinc acetate | 0.2 |

The urea and formaldehyde are mixed together until the urea is dissolved and the solution is then filtered to remove any insoluble matters. A solution of the sodium arsenate in a minimum quantity of water is added to the filtered solution and stirred until thoroughly mixed. The meta cresylic acid is next added and the mass consisting of urea, formaldehyde solution, sodium arsenate and meta cresylic acid, is placed in a pressure cooker. Heat is applied to the pressure cooker, as by means of indirect steam, and heating continued under such slight pressure as may be developed within the cooker until the temperature of the mass rises to about 99° C., or slightly under the boiling point of water. There is no loss of water content as the heating is carried out in a closed vessel.

After the heating has been continued for about 5 to 30 minutes at a temperature slightly below the boiling point of water, it is discontinued and the barium acetate or zinc acetate, dissolved in 0.5 part by weight of water, is added to the mixture. The resulting solution is allowed to cool in the cooker and is then ready for use as a binder for veneer sheets in the manner already described. As thus prepared, the binding agent has a specific gravity of approximately 1.1694 at 20° C., or approximately 20° Bé. The aqueous solution of the resin forming ingredients may be diluted with water until the density is as low as 10° Bé. or thereabouts before using the solution as a binding agent in the laminating of veneers.

In the foregoing formula, sodium arsenate is employed as a condensing agent. Other condensing agents of an alkaline character may be used, such as caustic soda, ammonia water, lime water (aqua calcis) and the like. Barium aceate and zinc acetate are employed as accelerating agents to hasten the completion of reaction between the urea and formaldehyde. Although these reagents may have a slightly alkaline reaction upon hydrolysis, their effectiveness is not dependent upon their alkalinity but they are considered as neutral condensing agents. Other reagents, such as sodium acetate, manganese acetate, magnesium acetate and the like may be substituted for or used in addition to the barium acetate or zinc acetate.

The urea used may be either a technical grade or a so-called fertilizer grade of urea, both of which run above 99% purity. Instead of meta cresylic acid, a crude grade of cresylic acid, running above about 95% purity, may be used. While other types of phenols, such as phenol itself, are capable of reacting in a similar manner to cresylic acid, I have found it more economical to use a commercially available, crude form of cresylic acid. However, crude phenol may be used, if desired.

The cresylic acid not only serves to utilize any excess of formaldehyde present over that necessary to react with the urea, but also imparts added flexibility and resiliency to the resinous binding composition. Meta cresylic acid may be used to replace all of the urea, but I have found that a composition containing urea and up to about 3% of cresylic acid, based on the weight of urea, imparts a better finish, where used as a surface coating, to the plywood. The surface is more glossy and harder than that produced using cresylic acid alone.

Other methylene condensing agents than formaldehyde may be used, such as hexamethylenetetramine, or polymers of formaldehyde, but a 40% aqueous solution of formaldehyde has been found to be entirely satisfactory.

*Example 2*

The following formula, in which parts by weight are given, illustrates a further embodiment of my invention in the use of resinous binding materials:

| | Parts |
|---|---|
| Urea | 100 |
| Cresylic acid | 100 |
| Formaldehyde (40% aqueous solution) | 400 |
| Caustic soda | 6 |

The sodium hydroxide or caustic soda is first made up into an aqueous solution, say of 38° Bé., and then added to the cresylic acid with stirring. A part of the caustic soda reacts with the cresylic acid to form sodium cresylate, which is water soluble. The water solubility of the mixture is thereby increased. The mixture of cresylic acid, sodium cresylate, caustic soda and water is then added to a filtered solution of urea and formaldehyde and the mass heated at slightly below the boiling point of water in a pressure cooker, as described in connection with Example 1. Condensing agents may be used as described in connection with Example 1 or may be omitted.

*Example 3*

The following formula illustrates a resin forming composition prepared from cresylic acid and formaldehyde, without the use of urea:

| | Parts |
|---|---|
| Cresylic acid | 200 |
| Formaldehyde (40% aqueous solution) | 200 |
| Caustic soda | 10 |
| Ammonium hydroxide (28% aqueous solution) | 10 |
| Triethanolamine | 0.5 |
| Water | 385 |

The 10 parts of caustic soda are dissolved in water to form about a 38° Bé. solution and this solution added to the cresylic acid. Formaldehyde and triethanolamine are next added and the mixture agitated and heated to about 70 to 90° C., at which temperatures the mixture is maintained for about 15 minutes. It is then allowed to cool gradually to below 60° C. and water is slowly added with stirring until the specified amount has been incorporated. Dilution of the solution may, however, be carried to any degree desired, between 2 and 10° Bé., without causing precipitation of the resin forming ingredients.

The caustic soda aids in increasing the solubility of the initial condensation product produced by the reaction between formaldehyde and cresylic acid, or sodium cresylate. The triethanolamine, which may be a commercial mixture of the tri-, di- and mono-ethanolamines, acts as an emulsifying agent to prevent precipitation of the partial condensation product. It is important to note that there is no concentration of the liquid mass during the heating period and that the reaction is not carried beyond the point at which the partial condensation product is still water soluble, or capable of forming a stable emulsion in water.

Example 4

To the formula given under Example 3, there may be added about 0.5 part by weight of oleic acid (red oil) as an aid to emulsification. Also, instead of heating the mass to 70 to 90° C., the heat of reaction between the various ingredients may be utilized to bring the mass up to a temperature of about 70° C. and the mass maintained at that temperature for about 30 minutes. The mass then becomes relatively thick and viscous and may be thinned by the addition of the amount of water specified in Example 3, the water being added at a temperature of about 70° C. with constant stirring. The mass initially becomes milky upon the addition of water but gradually clears up. Alcohol, such as denatured ethyl alcohol, or wood alcohol, may be added in quantities of from 50 to 100 parts by weight to further reduce the viscosity and increase the penetrating powers of the aqueous mixture.

Example 5

| | Parts |
|---|---|
| Cresylic acid | 200.0 |
| Formaldehyde (40% aqueous solution) | 216.0 |
| Caustic soda | 32.0 |
| Triethanolamine | 0.5 |
| Oleic acid | 0.3 |
| Water | 500.0 |

20 parts of caustic soda are dissolved in water to form about a 38° Bé. solution and this solution added to the cresylic acid; then, formaldehyde, oleic acid and triethanolamine are added and the mixture agitated. The heat of reaction between the various ingredients brings the mass up to a temperature of from about 70° C. to 96° C. and the mass maintained at that temperature for about sixteen minutes. Next, 12 parts of caustic soda are dissolved in 500 parts of water and added to the mixture with constant stirring until cold. When it has a density of 10° Bé. the solution may be further diluted by the addition of water without causing a precipitation of the resin. The mixture is a clear amber colored solution.

Example 6

| | Parts |
|---|---|
| Cresylic acid | 200.0 |
| Sodium sulphite | 50.0 |
| Formalhehyde (40% aqueous solution) | 216.0 |
| Triethanolamine | 0.5 |
| Oleic acid | 0.2 |
| Water | 500.0 |

50 parts of sodium sulphite are dissolved in the cresylic acid, with constant stirring. Formaldehyde is added and the mixture agitated, the heat of reaction between the various ingredients brings the mass up to a temperature of about 75° C. and the mass is maintained at that temperature for about 45 to 60 minutes. The triethanolamine, oleic acid are next added to 500 parts of water and incorporated into the mass with constant stirring until cold.

In coating wood veneer with any of the foregoing aqueous solutions, the coating may be effected by means of the usual type of glue spreaders used in the manufacture of plywood, or the coating may be sprayed or brushed on to the surface of the veneer. Where a urea type of resin forming composition is used, the Baumé of the aqueous solution will in general be approximately 20° Bé., but where a cresylic acid type of condensation agent is used, the aqueous solution may satisfactorily be between 2 and 10° Bé. In any case, a minor proportion of alcohol may be employed, although this is not generally necessary and is usually omitted in order to lower the cost of the operation.

The amount of aqueous binding solution to be applied to the veneer will depend upon the results desired. Excellent results have been obtained using 0.33 oz. of aqueous binding solution per sq. ft. for each glue line. In general, it is sufficient to use between 5 and 15 pounds of resin forming ingredients, on a dry basis, per M square feet of veneer surface being coated. Larger proportions of coating composition may be applied where a denser, more fire resistant and water resistant plywood is desired.

After the coating composition has been applied to the surface of the veneer or core, the coated surfaces are allowed to dry or are dried by means of a current of warm or hot air. The plies are then assembled in the usual manner and placed in a hydraulic press. The stack of superimposed plies between the platens of the press is subjected to pressures between 150 and 500 lbs. per sq. in. and at temperatures varying from 200 to 400° F. for from 1 to 5 minutes or over, depending upon the size and thicknesses of the stack of plies and the density desired in the finished plywood. As a typical example, the press may be operated at a pressure of 170 lbs. per sq. in. and at a temperature of 320° F. –340° F. for a period of 2 to 3½ minutes.

As soon as the press operation is complete, the stack of laminated plies is withdrawn from the press without cooling the platens and the pressing operation repeated on a subsequent charge. Under the conditions specified, the resin forming ingredients are converted into a hard, infusible resin that serves to bond the constituent plies firmly together. Joints formed, using the resin producing formulae above given, are practically invisible and result in no staining or discoloration of the veneer.

If desired, a surface coating may be applied to the external veneer surfaces by applying an aqueous solution of the resin forming ingredients thereover and then inserting the superimposed plies between the smooth platens of the press. In the case of the urea type of condensation products, a hard, dense, glass-like surface coating is imparted to the veneer.

Plywood panels made in accordance with the present invention, as herein described, may vary in size from a few inches square to as large as 12 feet by 4 feet, or even larger, depending entirely upon the size of the press employed for heating and pressing the laminated sheets.

If it is desired to more thoroughly impregnate the laminations with the synthetic resinous binding agents, the veneer strips may be soaked in an aqueous bath of the resin forming ingredients, as described in my copending application Serial No. 718,874, filed April 3, 1934. In that event, the sheets are placed in a suitable macerating tank, containing the aqueous binding solution, for a period of time varying from 15 to 60 minutes, according to the thickness of the sheets, and other conditions. During this period of immersion in the liquid solution, the veneer sheet absorbs or soaks up the binding solution, which permeates its interior cellular structure, as well as the exterior pores of the wood. The veneer sheets thus treated may absorb a quantity of the resin forming compound equal to approximately 5 to 20% of dry resinous material on the dry weight of the wood.

After impregnation, the sheets are removed from the bath and allowed to dry at a moderate temperature, preferably not to exceed 100° C. During this drying process a thin film of the binding material is formed on the surfaces of the sheet, such film ordinarily not exceeding 0.01 of an inch in thickness, and all of the cellular structure of the wood, as well as the interstices, are filled with the resin forming compound and effectively sealed in a water resistant and fire resistant condition upon subsequent fusion of the partial condensation product in the presses.

It will be understood, however, that in most cases the aqueous solution of resin forming ingredients is applied merely to the surfaces of the veneer strip, since this results in greater economy in the use of materials. A strong bond is produced between the plies of the laminated article with the use of a comparatively small amount of the synthetic resin. Because of the substantially waterproof and infusible nature of the binder, the resulting product is both water and fire resistant. Even upon prolonged immersion in boiling water there is little or no separation of the constituent plies. After being soaked in water, the bond will usually be found to be as strong as the wood itself.

The following illustrates typical tests on my plywood using urea-cresylic acid and water soluble cresylic acid binding solutions:

| Type of binder | Spread 1,000 sq. ft. of single glue line | Dry shear | Wood failure | 72 hr. soaking wet shear | Wood failure |
| --- | --- | --- | --- | --- | --- |
|  | Pounds | Lbs./sq. in. | Percent | Lbs./sq. in. | Percent |
| Urea cresylic | 6.9 | 328 | 83 | 230 | 19 |
| Water soluble cresylic | 6.25 | 281 | 88 | 264 | 61 |

Each figure represents average of 20 test samples.

Since the urea and/or cresylic acid types of synthetic resin are substantially colorless, the joints in the plywood of my invention show no discoloration and the resin itself is scarcely discernible. This in itself constitutes a considerable improvement over plywood made with other types of bonding agent, such as soy bean glue.

I am aware that numerous details of the process may be varied through a wide range without departing from the principles of this invention, and I, therefore, do not purpose limiting the patent granted hereon otherwise than necessitated by the prior art.

I claim as my invention:

1. In the process of making plywood including the coating of plies of wood with a resinous partial condensation product and the uniting together of said plies under the application of heat and pressure to convert the partial condensation product into a hard infusible resin, the improvement comprising coating said plies with an aqueous solution of the partial condensation product prepared by reacting cresylic acid and an aldehyde at temperatures slightly below the boiling point of water in the presence of a condensing agent, said product being thoroughly miscible with water.

2. In the process of making plywood including the coating of plies with a resinous partial condensation product and the uniting together of said plies under the application of heat and pressure to convert the partial condensation product into a heat stable infusible and insoluble resin, the improvement comprising coating said plies with a dilute aqueous solution of the partial condensation product prepared by reacting cresylic acid and an aldehyde at temperatures slightly below the boiling point of water in the presence of small amounts of caustic alkali, said product being miscible with water in all proportions.

3. In the process of making plywood including the coating of plies of wood with a resinous partial condensation product and the uniting together of said plies under the application of heat and pressure to convert the partial condensation product into a hard, infusible, and insoluble resin, the improvement comprising coating said plies with an aqueous solution of the partial condensation product prepared by reacting cresylic acid and an aldehyde in the presence of a condensing agent and controlling the time and temperature of the reaction to obtain only a partial condensation product of the reacting ingredients that is miscible with water in all proportions.

4. The process of claim 3 wherein the aldehyde with which the cresylic acid reacts is formaldehyde.

JAMES V. NEVIN.